(12) United States Patent
Yochai et al.

(10) Patent No.: US 8,688,935 B1
(45) Date of Patent: Apr. 1, 2014

(54) STORAGE SYSTEM AND METHOD FOR SNAPSHOT SPACE MANAGEMENT

(75) Inventors: Yechiel Yochai, Menashe (IL); Leo Corry, Ramat Gan (IL); Haim Kopylovitz, Herzliya (IL)

(73) Assignee: Infinidat Ltd, Herzliya (IL)

( * ) Notice: Subject to any disclaimer, the term of this patent is extended or adjusted under 35 U.S.C. 154(b) by 600 days.

(21) Appl. No.: 13/004,947

(22) Filed: Jan. 12, 2011

Related U.S. Application Data

(60) Provisional application No. 61/296,297, filed on Jan. 19, 2010.

(51) Int. Cl.
*G06F 12/00* (2006.01)

(52) U.S. Cl.
USPC ........... 711/162; 711/112; 711/114; 711/154; 711/156; 707/639; 707/649

(58) Field of Classification Search
USPC .......... 711/162, 112, 114, 154, 156; 707/639, 707/649
See application file for complete search history.

(56) References Cited

U.S. PATENT DOCUMENTS

| | | | |
|---|---|---|---|
| 5,403,639 A * | 4/1995 | Belsan et al. ........................ | 1/1 |
| 6,584,551 B1 | 6/2003 | Huber | |
| 6,898,669 B2 * | 5/2005 | Tomita ........................... | 711/114 |
| 7,159,072 B2 | 1/2007 | Kitamura | |
| 7,343,514 B2 * | 3/2008 | Yamato et al. ............... | 714/6.12 |
| 7,987,326 B2 * | 7/2011 | Nguyen ......................... | 711/162 |
| 8,478,799 B2 * | 7/2013 | Beaverson et al. ........... | 707/823 |
| 2008/0016121 A1 | 1/2008 | Revah et al. | |
| 2008/0281875 A1 | 11/2008 | Wayda et al. | |
| 2009/0019251 A1 | 1/2009 | Helman et al. | |
| 2011/0258461 A1 * | 10/2011 | Bates ............................. | 713/190 |
| 2011/0271010 A1 * | 11/2011 | Kenchammana et al. .... | 709/244 |
| 2013/0290263 A1 * | 10/2013 | Beaverson et al. ........... | 707/649 |

* cited by examiner

*Primary Examiner* — Stephen Elmore
(74) *Attorney, Agent, or Firm* — Reches Patents

(57) ABSTRACT

In accordance with certain aspects of the presently disclosed subject matter, there is provided a storage system and a method of storing data thereof. The method comprises: storing a plurality of snapshots of a certain source; assessing to at least one given snapshot an assessed value characterized by at least one of the following values and/or derivatives thereof: i. a first value characterizing the amount of unique physical data blocks associated, merely, with said given snapshot; ii. a second value characterizing the amount of unique physical blocks associated merely with a certain group of snapshots comprising said given snapshot; iii a combination of the first and the second value; and updating the assessed value responsive to a pre-defined event. The method can further comprise generating an alert when the updated assessed value and/or derivatives thereof match a pre-defined criterion; and/or providing an indication of amount of physical resources to be freed resulting from deleting at least the given snapshot, wherein said indication corresponds to the updated assessed value; and/or generating deletion recommendation in accordance with the updated assessed value; and/or automated deleting at least the given snapshot when the updated assessed value matches a threshold characterized by one or more pre-defined rigid conditions for deleting.

26 Claims, 5 Drawing Sheets

STORAGE SYSTEM AND METHOD FOR SNAPSHOT SPACE MANAGEMENT

CROSS-REFERENCES TO RELATED APPLICATIONS

This application relates to and claims priority from U.S. Provisional Patent Application No. 61/296,297 filed on Jan. 19, 2010 incorporated herein by reference in its entirety.

FIELD OF THE INVENTION

The present invention relates generally to systems and methods of storing data and, particularly, to methods of data storage space management and systems thereof.

BACKGROUND OF THE INVENTION

Modern storage systems are configured to enable providing copies of existing data for purposes of backup, possible restore in case of future data corruption, testing, etc. The copies may be provided with the help of backup and/or snapshot techniques. The use of snapshot techniques greatly reduces the amount of storage space required for archiving large amounts of data. However, there are still situations where it is desirable to delete snapshots or otherwise manage the copies of data in order to deal with storage capacity constraints.

Problems of snapshots storage space management have been recognized in the Prior Art and various systems have been developed to provide a solution. For example:

U.S. Pat. No. 6,584,551 (Huber) discloses a system and method for dynamically expanding a snapshot repository based on predefined parameters. The snapshot repository is monitored for determining if the amount of information stored in the snapshot repository has reached a predetermined volume increase threshold. If a determination is made that the volume increase threshold has been reached, the volume of the snapshot repository is automatically increased. The snapshot repository may also be monitored for determining if the amount of information stored in the snapshot repository has reached a predetermined maximum snapshot repository volume whereupon a warning may be provided.

U.S. Pat. No. 7,159,072 (Kitamura) discloses copy-on-write snapshot processing performed on a storage system in order to produce snapshots of one or more logical volumes in the storage system. The write I/O operations made to the storage system are observed for a certain period of time. Based on observations, an estimate of the size of the storage space required to preserve the snapshot data can be computed. This information can be used to provide sufficient storage space for the snapshot process.

US Patent Application No. 2008/016121 (Revach et. al) discloses an apparatus and a method of managing a snapshot storage pool (SSP) associated with a storage unit of a distributed data storage system. The apparatus includes a logic module and a controller. The logic module is adapted to provide a threshold corresponding to a ratio between a current amount of storage resources used for storing snapshots in the SSP and a total storage capacity defined for the SSP. The controller is adapted to trigger an action which may be effective for managing the SSP in response to the amount of storage resources used for storing snapshots in the SSP crossing the threshold.

US Patent Application No. 2008/281875 (Waida et. al) discloses a method, device, and system for determining when to re-initialize a backing store in a data storage system. When all snapshots associated with a specified backing store are either being deleted or are marked for deletion, the backing store is re-initialized rather than deleting each snapshot independently. The re-initialization of the backing store provides for a quicker way to delete all snapshots than can be achieved by deleting each snapshot independently.

US Patent Application No. 2009/0019251 (Helman et. al) discloses a method for data storage, including configuring in a data storage system a volume storage pool as data storage resources available for allocation of volumes in the data storage system. The method also includes defining a threshold value for the volume storage pool. When the allocation of the volumes causes the threshold value to be crossed, the method includes performing an action for managing the volume storage pool.

SUMMARY OF THE INVENTION

In accordance with certain aspects of the presently disclosed subject matter, there is provided a method of storing data in a data storage system. The method comprises: storing a plurality of snapshots of a certain source; assessing to at least one given snapshot an assessed value characterized by at least one of the following values and/or derivatives thereof: i. a first value characterizing the amount of unique physical data blocks associated, merely, with said given snapshot; ii. a second value characterizing the amount of unique physical blocks associated merely with a certain group of snapshots comprising said given snapshot; iii a combination of the first and the second value; and updating the assessed value responsive to a pre-defined event.

The method can further comprise generating an alert when the updated assessed value and/or derivatives thereof match a pre-defined criterion. Alternatively or additionally, the method can further comprise providing an indication of amount of physical resources to be freed resulting from deleting at least the given snapshot, wherein said indication corresponds to the updated assessed value. Alternatively or additionally, the method can further comprise displaying the updated assessed value with the help of monitoring tools. Alternatively or additionally, the method can further comprise generating deletion recommendation in accordance with the updated assessed value. Alternatively or additionally, the method can further comprise automated deleting at least the given snapshot when the updated assessed value matches a threshold characterized by one or more pre-defined rigid conditions for deleting.

In accordance with other aspects of the presently disclosed subject matter, there is provided a storage system comprising a physical storage space operatively connected to a control layer, wherein the physical storage space is operable to store a plurality of snapshots of a certain source; the control layer comprises at least one metering unit operable to assess to at least one given snapshot an assessed value characterized by at least one of the following values and/or derivatives thereof: i. a first value characterizing the amount of unique physical data blocks associated, merely, with said given snapshot; ii. a second value characterizing the amount of unique physical blocks associated, merely, with a certain group comprising said given snapshot; iii. a combination of the first and the second value; and wherein said metering units are further operable to update, responsive to a pre-defined event, the assessed value.

The control layer can comprise at least two metering units, wherein a first metering unit is operable to assess to a given snapshot an assessed value characterized by the first value, and a second metering unit is operable to assess to said given snapshot an assessed value characterized by the second value. Optionally, the system can be configured to provide each snapshot with at least one dedicated metering unit.

At least one metering unit can be further operable to enable alerting when the updated assessed value and/or derivatives thereof match a pre-defined criterion. Alternatively or additionally, at least one metering unit can be further operable to enable indication of the amount of physical resources to be freed resulting from deleting at least the given snapshot, wherein said indication corresponds to the updated assessed value. Alternatively or additionally, at least one metering unit can be further operable to enable generating deletion recommendation in accordance with the updated assessed value.

In accordance with other aspects of the presently disclosed subject matter, there is provided a method of managing a plurality of snapshots of a certain source, the method comprising: assessing to at least one given snapshot an assessed value characterized by at least one of the following values and/or derivatives thereof: i. a first value characterizing the amount of unique physical data blocks associated, merely, with said given snapshot; ii. a second value characterizing the amount of unique physical blocks associated, merely, with a certain group of snapshots comprising said given snapshot; iii. a combination of the first and the second value; and updating the assessed value responsive to a pre-defined event.

In accordance with other aspects of the presently disclosed subject matter, there is provided a snapshot management module operable to manage a plurality of snapshots of a certain source, the module comprising at least one metering unit operable to assess to at least one given snapshot an assessed value characterized by at least one of the following values and/or derivatives thereof: i. a first value characterizing the amount of unique physical data blocks associated, merely, with said given snapshot; ii. a second value characterizing the amount of unique physical blocks associated, merely, with a certain group of snapshots comprising said given snapshot; iii. a combination of the first and the second value; wherein said metering units are further operable to update, responsive to a pre-defined event, the assessed value.

In accordance with further aspects of the presently disclosed subject matter, the certain group of snapshots can be configured as a group of snapshots constituted by said given snapshot and all its previously created siblings; a group of snapshots constituted by said given snapshot and all its ancestors; a group of snapshots constituted by said given snapshot, all its ancestors and all its previously created siblings; a group of snapshots constituted by said given snapshot, its ancestors and its siblings, wherein the ancestors and siblings match pre-defined grouping criterion, or otherwise.

In accordance with further aspects of the presently disclosed subject matter, the pre-defined event for updating the assessed value can be associated with arriving incoming data related to the source and/or associated with a pre-defined time schedule and/or associated with receiving a request for deleting at least the given snapshot.

In accordance with further aspects of the presently disclosed subject matter, the predefined criterion for alerting can be characterized by a maximal number of unique blocks associated with all snapshots created before a certain date; and/or by one or more pre-defined rigid conditions for deleting certain snapshots and/or groups thereof.

In accordance with further aspects of the presently disclosed subject matter, the indication can be provided, by way of non-limiting example, responsive to receiving a request for deleting at least the given snapshot, and/or achieving one or more rigid conditions for deleting certain snapshots and/or groups thereof, and/or achieving a pre-defined expiration date of said given snapshot.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, storage system and parts thereof disclosed in the present applications.

The term "criterion" used in this patent specification should be expansively construed to include any compound criterion, including, for example, several criteria and/or their logical combinations.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

The references cited in the background teach many principles of data storage systems and data storage space management that are applicable to the present invention. Therefore the full contents of these publications are incorporated by reference herein where appropriate for appropriate teachings of additional or alternative details, features and/or technical background.

Figure 1:
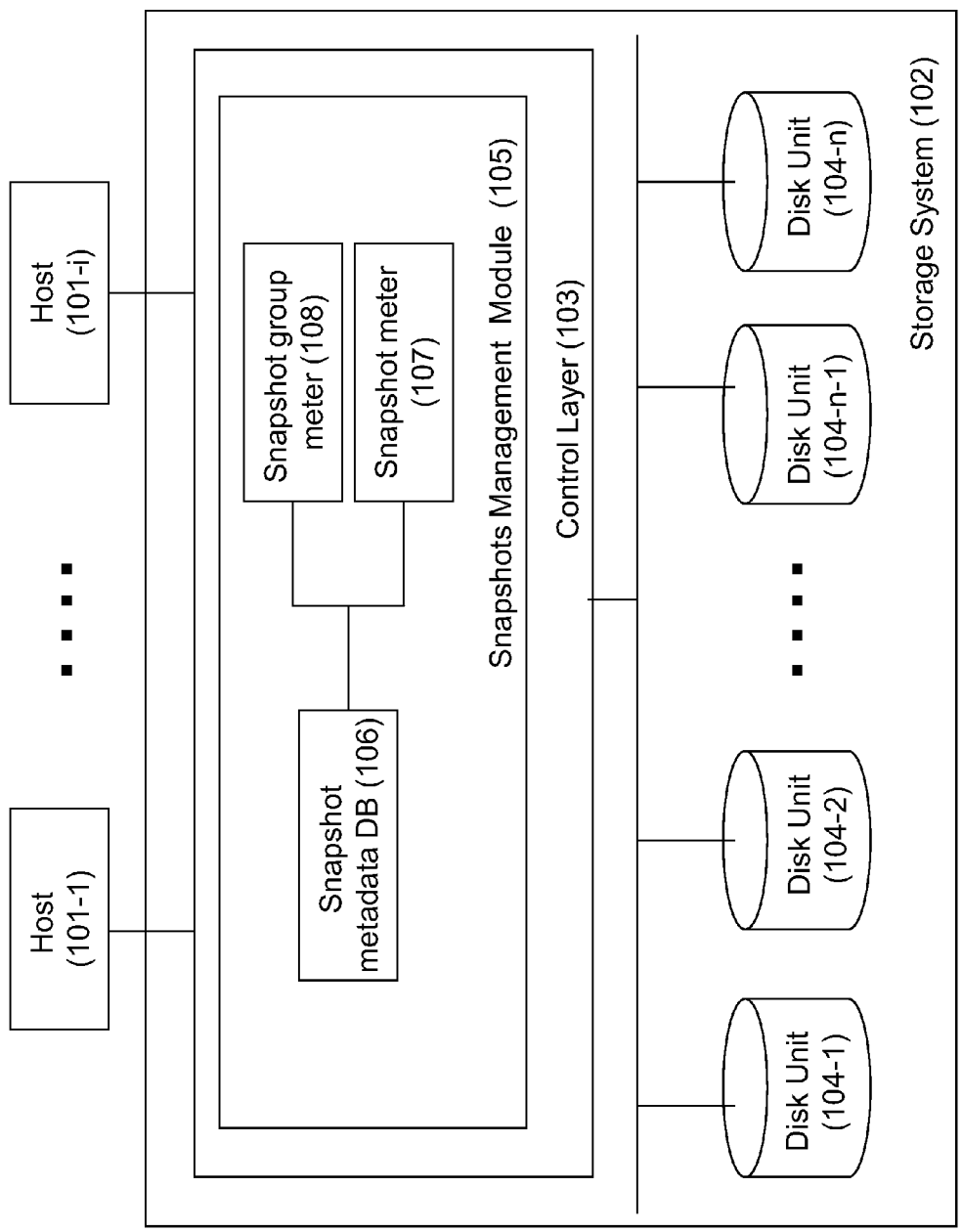
FIG. 1 illustrates a generalized functional block diagram of a mass storage system in accordance with certain embodiments of the presently disclosed subject matter.

Bearing this in mind, attention is drawn to FIG. 1 illustrating a non-limiting example of a schematic functional diagram of a mass storage system where the presently disclosed subject matter can be implemented.

The illustrated mass storage system 102 provides common storage means to be shared by a plurality of host computers (illustrated as 101-1-101-n). The storage system comprises a control layer 103 comprising one or more appropriate storage control devices operatively coupled to the plurality of host computers and operable to control I/O operations between the plurality of host computers and a plurality of data storage devices (e.g. a plurality of physical disk drives (PD) organized in one or more arrays illustrated as disk units 104-1-104-n). The storage devices constitute a physical storage space optionally distributed over one or more storage nodes, wherein the storage control layer is operable to control interface operations (including I/O operations) between the host computers and the storage physical space. The storage system is configured in a manner enabling direct or indirect serving a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-n). The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data may be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes. Those skilled in the art will readily appreciate that the teachings of the presently disclosed subject matter are applicable in a similar manner to other logical objects.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into data portions that act as basic units for data handling and organization within the system.

When receiving a write request from a host, the storage control layer defines a physical location(s) designated for writing the respective data. Similarly, when receiving a read request from the host, the storage control layer defines the physical location(s) of the desired data portion(s) and further processes the request accordingly. The storage control layer further issues updates of a given data object to all storage nodes which physically store data related to the data object. The storage control layer is further operable to redirect the request/update to storage device(s) with appropriate storage location(s) irrespective of the specific storage control device receiving I/O request.

The control layer further comprises a snapshots management module 105 configured to manage snapshots and groups thereof. Metadata related to snapshot management can be accommodated at a dedicated location(s) in the storage devices and/or in a non-volatile memory comprised in the control layer (e.g. implemented as snapshot metadata database 106 of the snapshot management module). By way of non-limiting example, the metadata accommodated in connection with snapshots management can include the snapshot volume identifiers, flags indicating various states related to the snapshot (e.g., in use, delete in progress, marked for deletion, delete complete, etc.), size of snapshot volumes, location of allocation bitmap characterizing organization of snapshot data, and the like.

Figure 2A:
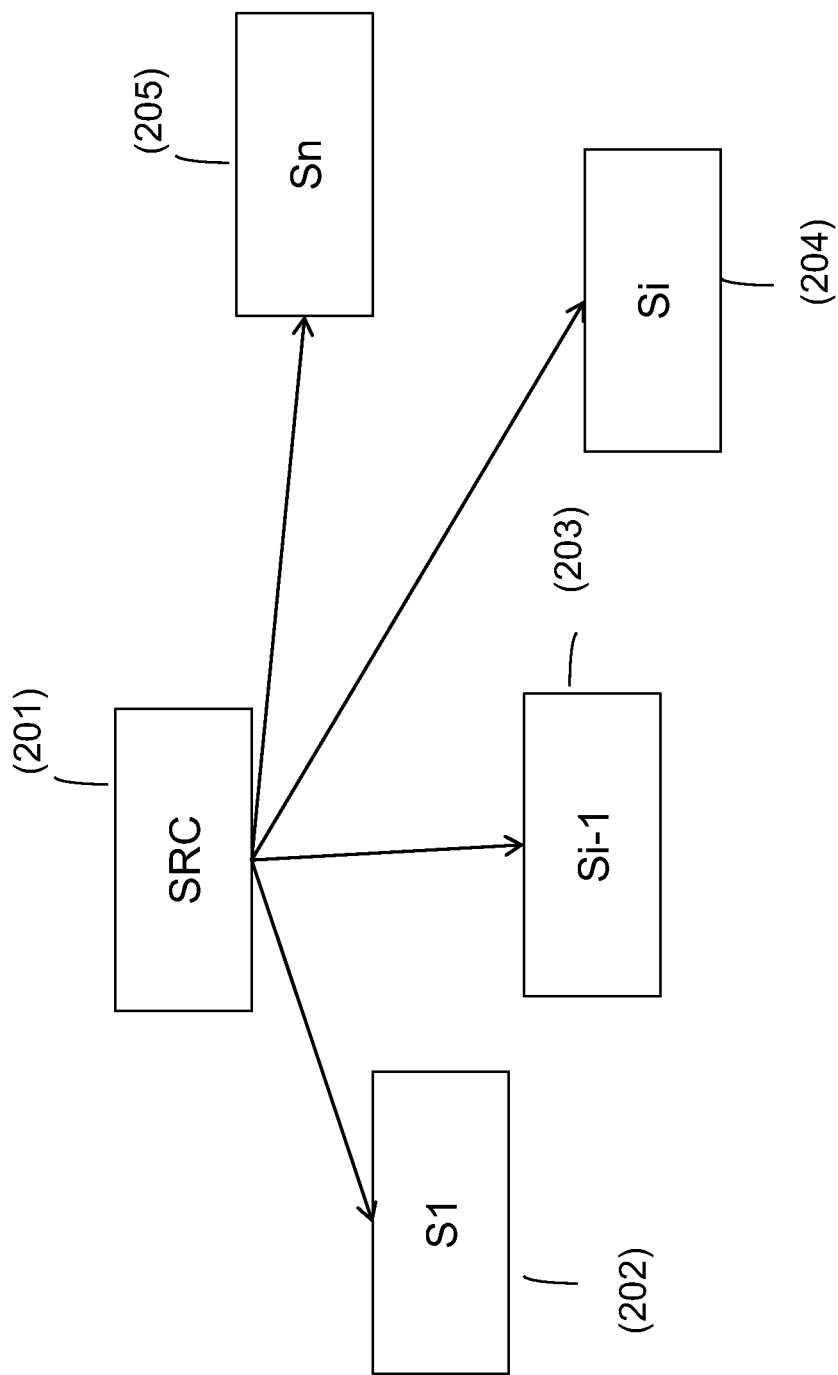
FIGS. 2a-2b illustrate exemplified schematic diagrams of snapshot generation trees applicable to certain embodiments of the currently presented subject matter.
Figure 2B:
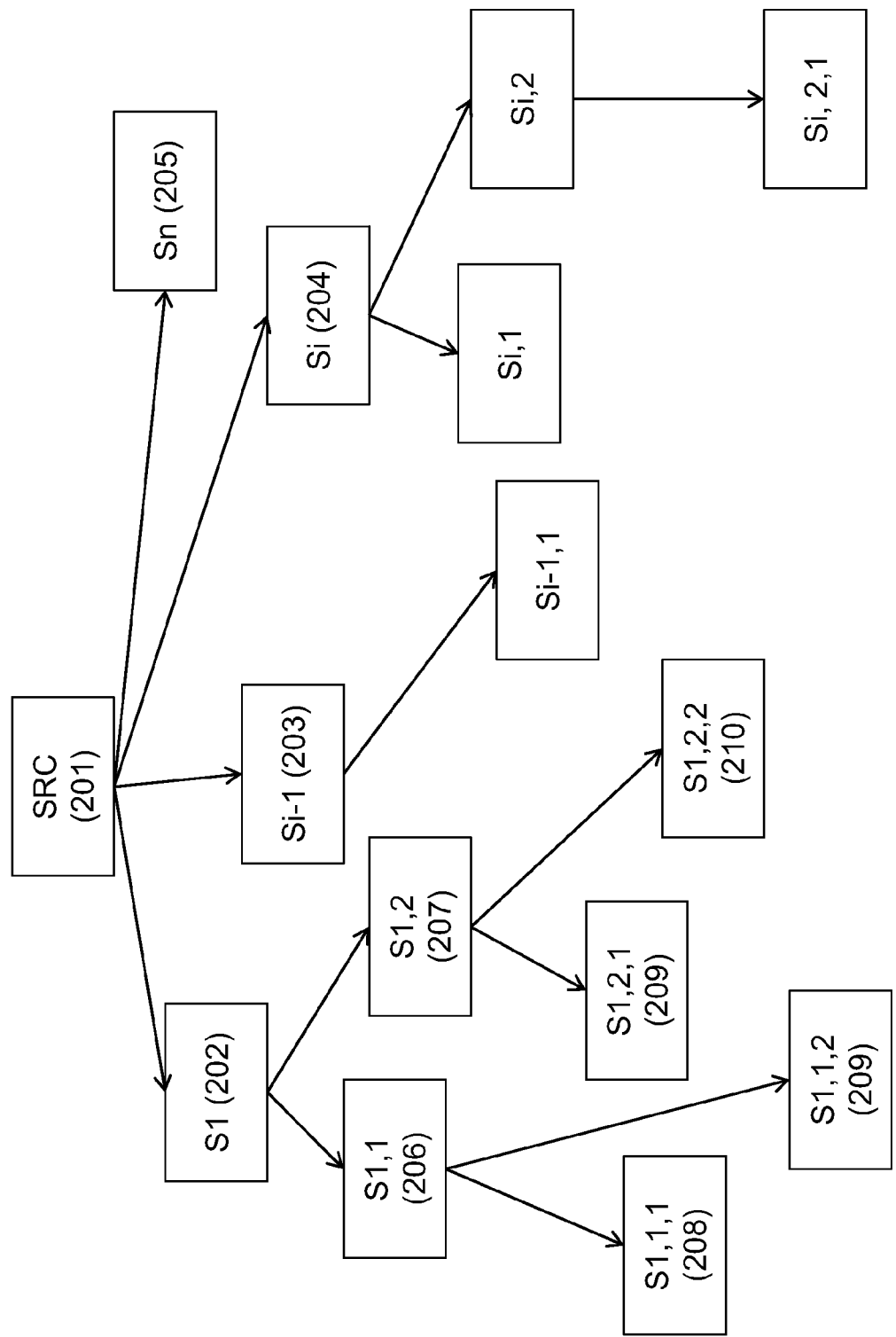

FIGS. 2a-2b illustrate non-limiting examples of schematic diagrams of snapshots organization known in the art and applicable to certain embodiments of the currently presented subject matter. The snapshot is a logical entity representing a virtual copy of a storage volume as it existed at the time of establishing the snapshot. All snapshots of a certain storage unit represent ranges of equal number of the successive storage blocks associated with respective volume. A snapshot is usually implemented by using markers or pointers. Any newly created snapshot shares data with the source storage volume with the help of pointers constituting a part of the system metadata. Hence, at the time of creation, the new snapshot consumes no additional physical resources for storing the data associated with it on the disks. Only when a portion of either the source or its respective snapshot is modified, new data is created and, accordingly, new physical resources are allocated to this data in the disks.

FIG. 2a illustrates a snapshot generation tree constituted by a source storage volume (201) represented in the root of the tree, first snapshot $S_1$ (202) of the source volume and subsequently generated snapshots $S_2$-$S_n$ (203-205), each, at the moment of creation, representing an instant copy of the source.

FIG. 2b illustrates an example of a more complicated structure of the snapshot generation tree. Copies $S_{1,1}$ (206) and $S_{1,2}$ (207) have been generated for the snapshot $S_1$. Copies $S_{1,1}$, $S_{1,2}$ are children of $S_1$ and siblings of each other, while $S_{1,1}$, have been created before $S_{1,2}$. Indexes in the following snapshots represent the same convention. Likewise, copies $S_{1,1,1}$ (208) and $S_{1,1,2}$ (209) are successive siblings generated of the snapshot $S_{1,1}$, etc. A node that is connected to all lower-level nodes is called an "ancestor". Accordingly, sibling nodes $S_{1,1,1}$ (208) and $S_{1,1,2}$ (209) have snapshot ancestors $S_{1,1}$ (206) and $S_1$ (202); and sibling nodes $S_{1,2,1}$ (209) and $S_{1,2,2}$ (210) have snapshot ancestors $S_{1,2}$ (207) and $S_1$ (202). In general, the indexes are helpless to decide the sequence of any two snapshots in different branches (e.g. $S_{1,2,1}$ and $S_{i-1,2}$). Typically, the storage system implements a mechanism (e.g. updatable data structure) keeping an overall timeline of snapshots generation.

Since the amount of data that needs to be stored, resulting from snapshot generation and modification, accumulates with time, there arises a need to delete some of the stored snapshots to conserve the storage space.

However, efficiency of the deletion depends on how much space will be freed by deleting certain one or more snapshots; this space depends on a history of generation and modification of these certain deleted snapshots and the source thereof. Accordingly, as has been found by the inventors, it is important to know the exact amount of physical resources that will be de-allocated when a certain snapshot, or a group of snapshots, are deleted.

For purpose of illustration only, the following description is provided with respect to the tree illustrated in FIG. 2a having one generation of snapshots. Those skilled in the art will readily appreciate that the teachings of the presently disclosed subject matter are applicable, in a similar manner, to more complex cases (e.g. such as illustrated by way of non-limiting example in FIG. 2b).

Assume that $S_i$ is created at time $T_i$, and $S_{i+i}$ is created at time $T_{i+i}$. If before time TT, $T_i < TT < T_{i+}1$, a certain data portion DP of SRC has not been modified since creation of the first snapshot, and has not been modified in any one of the snapshots $S_k$ ($k \le i$), SRC and all of its snapshots will point to this data portion at time T<TT.

Assume that at time TT this certain data portion DP of SRC has been modified into DP'. As a result, all snapshots $S_k$ ($k \le i$) continue to point to DP, whereas SRC points to DP'. Deleting merely snapshot $S_i$ will not delete the data potion DP from the storage system and, hence, no space will be freed since all snapshots $S_1$-$S_{i-1}$ still point to DP. The DP will be deleted and the space will be freed only upon deletion of all snapshots $S_1$ to $S_i$.

When next snapshot $S_{i+1}$ is created at time $T_{i+1}$, both SRC and $S_{i+1}$ will point to DP' (or some modification thereof provided during time $\Delta=T_{i+1}-TT$), while all the preceding snapshots will continue to point to DP (assuming that the DP portion in these preceding snapshots has not been modified). If, at a time $T_{i+i} < TT_1 < T_{i+2}$ (time of creation of snapshot $S_{i+2}$), the same data portion of SRC is further modified to DP'', the situation will be as follows:

snapshots $S_1$–$S_i$ point to DP;
snapshot $S_{i+1}$ points to DP';
source SRC points to DP''.

In the example, $S_{i+1}$ is the only snapshot pointing to data portion DP', and data portion DP' is associated merely with snapshot $S_{i+1}$. A data portion associated merely with a certain snapshot is referred to hereinafter as a unique data portion associated with the certain snapshot; and physical blocks corresponding to unique data portions are referred to hereinafter as unique physical blocks associated with the certain snapshot. If a certain snapshot is deleted, the space corresponding to the respective unique physical data blocks is freed. Likewise, a data portion associated merely with a certain group of snapshots is referred to hereinafter as a unique data portion associated with the certain group of snapshots; and physical blocks corresponding to such unique data portions are referred to hereinafter as unique physical blocks associated with the certain group of snapshots. If the certain group of snapshot is deleted, the space corresponding to the respective unique physical data blocks is freed.

If a certain snapshot has no writable child snapshots, all data portion which have been written to this certain snapshot will be unique.

Referring back to FIG. 1, in accordance with certain embodiments of the presently disclosed subject matter, the storage system is configured to comprise at least one of metering units (107) and (108). The metering units may be implemented in hardware, firmware, software or any appropriate combination thereof. The metering units may be implemented as a part of the snapshot management module (as illustrated in FIG. 1) and/or in any other appropriate managing and/or control tools or as separate functional blocks operatively coupled to the tools.

The metering unit 107 is operable to reckon the amount of unique physical data blocks currently associated with a certain snapshot $S_i$, (i.e. associated merely with this snapshot and not shared with any other snapshots). This metering unit is referred to hereinafter as a snapshot metering unit. The value accessed by the snapshot metering unit to a snapshot $S_i$ characterizes the amount of unique physical data blocks associated with the snapshot. Accordingly, this value is indicative of the amount of physical resources to be freed and become available upon deleting of the snapshot $S_i$. The value assessed by the metering unit to a snapshot $S_i$ at a moment of its creation is inevitably equal to zero, since SRC and $S_i$ snapshots share all of their physical blocks. The value varies along with modifications of SRC and/or the snapshots.

The metering unit 108 is operable to reckon the amount of unique physical blocks that are currently associated merely with a group comprising a certain snapshot $S_i$. This metering unit is referred to hereinafter as a snapshot group metering unit. By way of non-limiting example, the group can be constituted by the certain snapshot $S_i$ and all previously created sibling snapshots $S_0$-$S_{i-1}$. By way of another non-limiting example, in more complex cases (e.g. such as illustrated by way of non-limiting example in FIG. 2b), other group configurations are also possible. For example, the group can be constituted by a certain snapshot $S_{1,k,i}$ and ancestors $S_{1,k}$ and $S_1$. Alternatively, the group can further include all previously created sibling snapshots ($S_{1,k,0}$ $S_{1,k,i-1}$). Alternatively, the group can include only part of ancestors and/or siblings matching a pre-defined criterion (e.g. only sibling snapshots having no child snapshots, only ancestors having no respective siblings, etc.).

The value accessed by the snapshot group metering unit with regard to a group comprising certain snapshot $S_i$ characterizes the amount of unique physical data blocks merely associated with the group. This value is indicative of the amount of physical resources to be freed and become available upon deleting of all snapshots in the group.

Snapshot management techniques known in the art are capable to find out snapshots pointing to a given data portion at it at a given time. The metering units 107 and 108 are further configured to obtain this data from the snapshot management module (or other appropriate tool) and to assess the amount of unique physical blocks to respective snapshots. The value assessed by the metering units with regard to one or more certain snapshots can be updated every time that new incoming data modifies the respective source and/or snapshots Alternatively, the value can be calculated upon request, e.g. when a user and/or system consider the possibility of deleting certain one or more snapshots.

The metering units can be configured to update the value assessed with regard to one or more certain snapshots every time that new incoming data modifies the relationship between sources and their snapshots. Alternatively, the metering units can assess this value upon request, e.g. when a user and/or system consider the possibility of deleting certain snapshots. Optionally the snapshot metering unit and/or the snapshot group metering unit can comprise a plurality of meters, each meter statically or dynamically assigned to a certain snapshot.

Optionally, the metering units can be further configured to enable displaying the values assessed to one or more selected snapshots with the help of management and/or monitoring tools, and/or alerting a user (or appropriate blocks in the storage system) if the assessed values meet a pre-defined criterion.

Optionally, the metering units can be further configured to operate responsive to data received from the snapshot management unit and/or other functional blocks of the storage system (e.g. reckon the values responsive to a request from the snapshot management unit and/or a user; generate deletion recommendation responsive to a request from the snapshot management unit and/or a user, and/or responsive achieving a predefined condition; etc.).

Certain embodiments of the presently disclosed subject matter are applicable to the architecture of the storage system described with reference to FIG. 1. Equivalent and/or modified functionality may be consolidated or divided in another manner and may be implemented in any appropriate combination of software, firmware and hardware. The snapshot management module and the metering units can be implemented as centralized modules operatively connected to the plurality of storage control devices, may be distributed over a part or all storage control devices, and/or may be fully or partly integrated with the storage devices. In different embodiments the functional blocks and/or parts thereof may be placed in a single or in multiple geographical locations (including duplication for high-availability); operative connections between the blocks and/or within the blocks may be implemented directly (e.g. via a bus) or indirectly, including remote connection.

Figure 3:
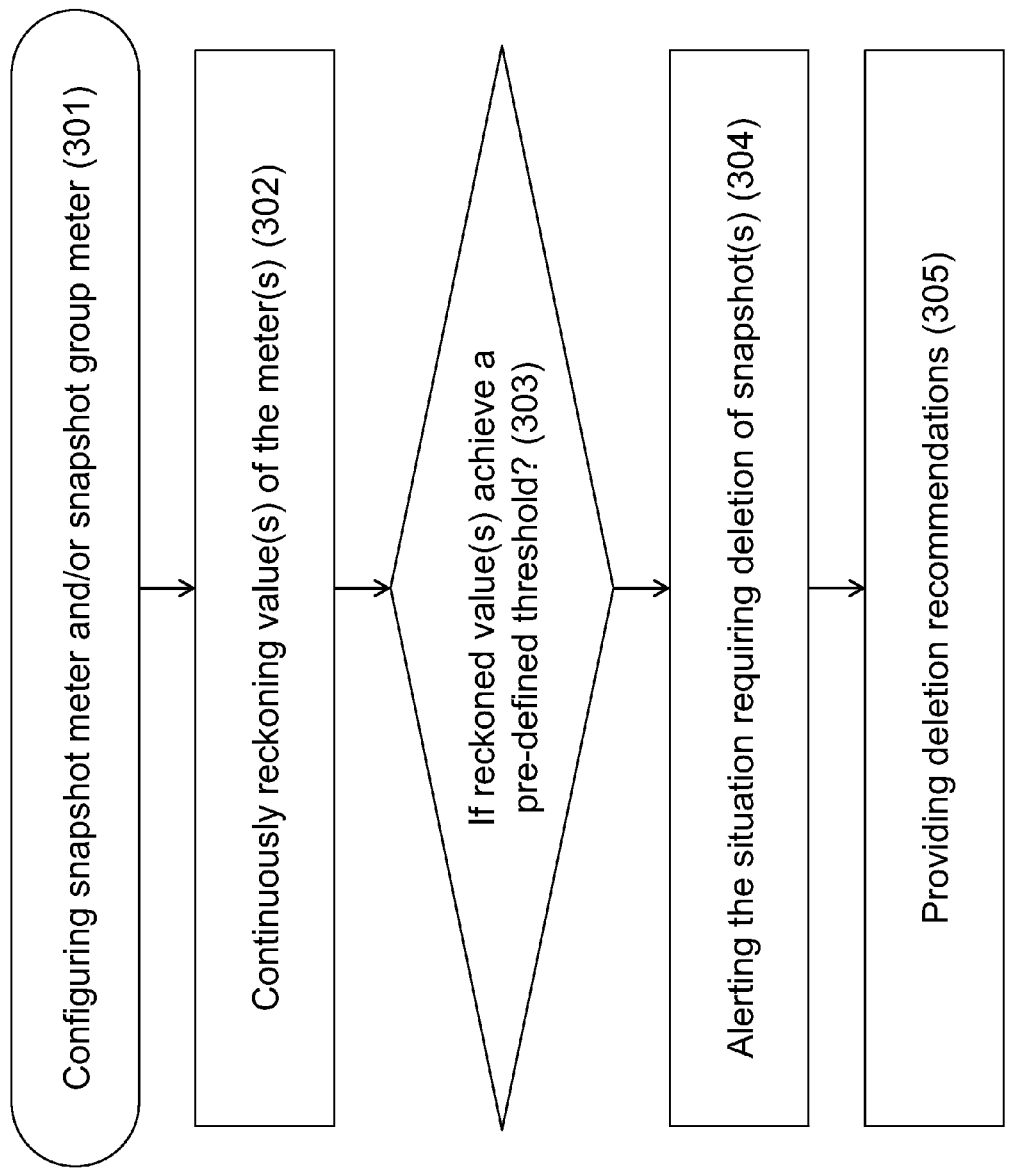
FIG. 3 illustrates a generalized flow chart of operating the storage system in accordance with certain embodiments of the presently disclosed subject matter.

Referring to FIG. 3, there is illustrated a generalized flow chart of operating the storage system in accordance with certain embodiments of the presently disclosed subject matter. After the snapshot metering unit and/or the snapshot group metering unit are configured (301) to be capable to assess values for selected snapshot(s) and/or snapshot group(s), they continuously reckon (302) the values related to the respective snapshot(s) and/or group(s). The assessed values can be, optionally, displayed with the help of appropriate visualization tools. The metering unit(s) and/or other appropriate functional blocks of the storage system continuously compare (303) if the assessed values or derivatives thereof meet a pre-defined criterion. By way of non-limiting example, the criterion may be pre-defined as a maximal number of unique blocks associated with snapshots created before a certain date. By way of another non-limiting example, the group can be configured as storage snapshots pool (SSP), and the criterion can be predefined as a combination of current aggregated number of unique blocks in a storage snapshots pool (SSP) with a threshold characterized by a ratio between a current amount of storage resources used for storing snapshots and a total storage capacity defined for the SSP. A non-limiting example of such a threshold is disclosed in US Patent Application No. 2008/016121 (Revach et. al) presented in the background of the present specification.

If the pre-defined criterion is met, the metering unit(s) enable alerting (304) that one or more snapshots shall be deleted. Optionally, the metering unit(s) can process the assessed values and provide recommendations which snapshot(s) to delete in order to free the maximal volume. Alternatively or additionally, the processing of the assessed value and generating recommendations can be provided, by the snapshot management module and/or other appropriate functional modules of the storage system.

Those versed in the art will readily appreciate that at least part of continuous operations detailed with reference to FIG. 3 can be provided in a similar manner in accordance with a predefined time schedule and/or responsive to a predefined event (e.g. request from a user or from appropriate functional block of the storage system).

Alternatively or additionally, in accordance with certain embodiments of the presently disclosed subject matter, the criterion can be predefined as a rigid threshold condition for deleting certain snapshots and/or groups thereof. Accordingly, the snapshots shall be mandatory deleted when the respective assessed values or derivatives thereof achieve such pre-defined thresholds. Optionally, the threshold can be configured as a combination of assessed values and other conditions of snapshot deletion (e.g. snapshot expiration date). The pre-defined rigid conditions of deleting the snapshots can be defined together with snapshot generation, and can be handled together with other parameters accommodated in connection with snapshot management (e.g. source and/or parent volume, ID, creation date, size, protection level, etc.). By way of non-limiting example, the absence of such a pre-defined rigid condition can be indicated by a negative number written in a respective parameter field. The storage system can be further configured to run a special background process that scans and checks the pre-defined rigid conditions of deleting existing snapshots, and compares them with current assessed values and/or derivatives thereof.

Figure 4:
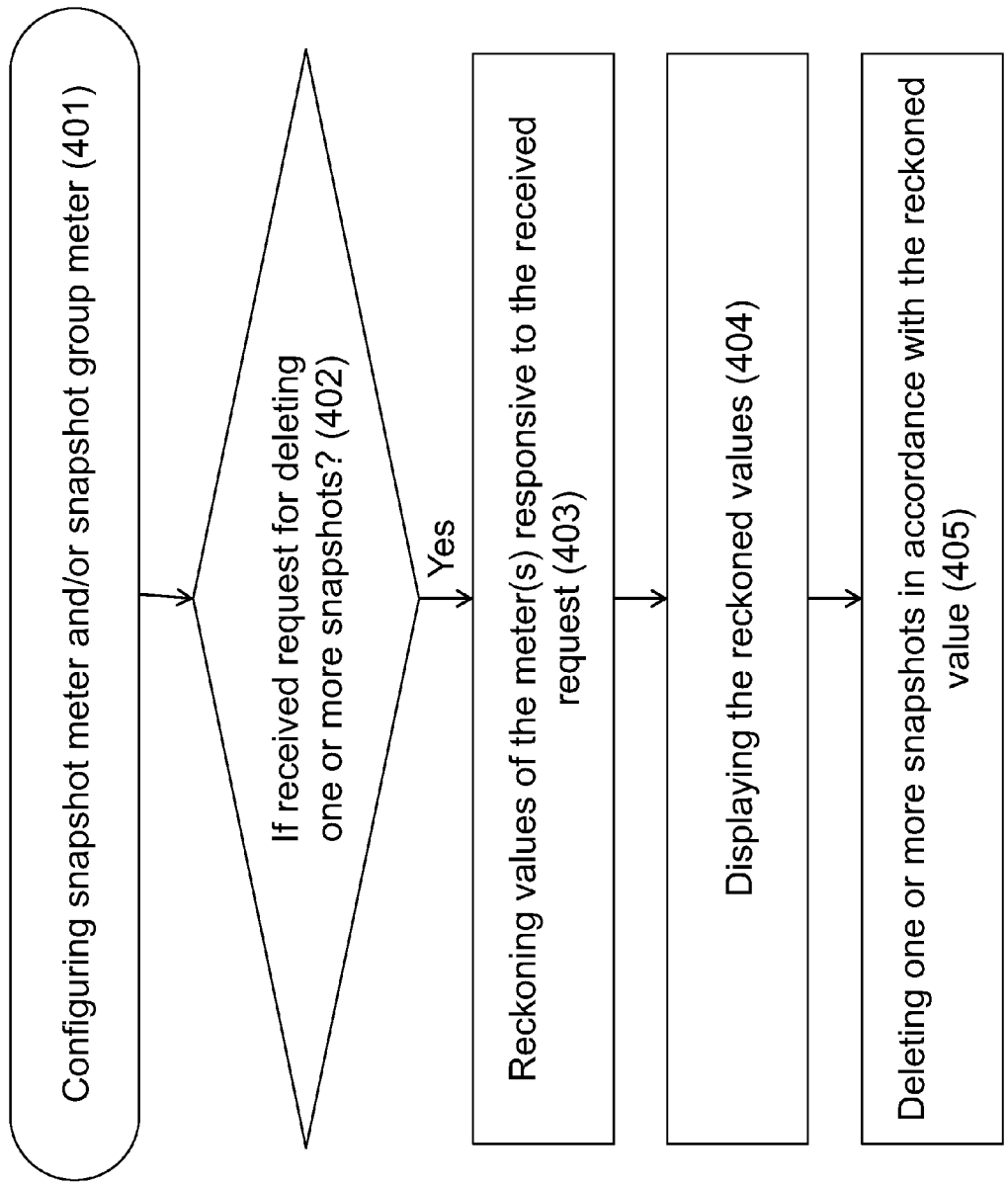
FIG. 4 illustrates a generalized flow chart of operating the storage system in accordance with other certain embodiments the presently disclosed subject matter.

Alternatively or additionally, the storage system may operate in accordance with certain embodiments illustrated in FIG. 4. After the snapshot metering unit and/or the snapshot group metering unit are configured (401) to be capable to assess values for selected certain snapshots and/or snapshot groups (e.g. snapshot pool, snapshots related to a certain source volume, all snapshots in the system, etc.), they can become aware of a request received (402) by the snapshot management module (or other appropriate functional block) for deleting one or more snapshots among the selected snapshots. The request can be initiated by a user or by appropriate functional blocks of the storage system (e.g. by the snapshot management module if the volume of certain snapshot(s) or snapshot group(s) achieves a predefined threshold). Responsive to awareness of the received request, the metering units reckon (403) the values related to the respective snapshots. The assessed values can be displayed (404) with the help of appropriate visualization tools, thus enabling the user to take the proper deletion decision. Alternatively or additionally, the metering units and/or other appropriate functional blocks of the storage system can process the assessed values and provide recommendations which snapshot(s) to delete in order to free the maximal volume and/or to achieve other objectives. Thus, the user is enabled to delete (405) the snapshots in accordance with the respective assessed values characterizing the physical space to be freed upon deletion. Optionally, the storage system can be configured to automatically delete the snapshots in accordance with the respective assessed values and pre-defined rules.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of storing data in a storage system, the method comprising, by the storage system:
 a. storing a plurality of snapshots of a certain source;
 b. assessing to at least one given snapshot an assessed value characterized by at least one of the following values:

i. a first value characterizing the amount of unique physical data blocks associated, merely, with said given snapshot;

ii. a second value characterizing the amount of unique physical blocks associated merely with a certain group of snapshots comprising said given snapshot; and iii. a combination of the first and the second value; and c. updating the assessed value responsive to a pre-defined event.

2. The method of claim 1, wherein the pre-defined event is selected from a group of events associated with arriving incoming data related to the source, events associated with a pre-defined time schedule, and events associated with receiving a request for deleting at least the given snapshot.

3. The method of claim 1, further comprising generating an alert when the updated assessed value match a pre-defined criterion.

4. The method of claim 1 further comprising providing an indication of amount of physical resources to be freed resulting from deleting at least the given snapshot, wherein said indication corresponds to the updated assessed value.

5. The method of claim 1, further comprising displaying the updated assessed value with the help of monitoring tools.

6. The method of claim 1, further comprising generating deletion recommendation in accordance with the updated assessed value.

7. The method of claim 1, further comprising automated deleting at least the given snapshot when the updated assessed value matches a threshold characterized by one or more pre-defined rigid conditions for deleting.

8. The method of claim 3, wherein the pre-defined criterion is selected from the group comprising:
   criterion characterized by a maximal number of unique blocks associated with all snapshots created before a certain date;
   criterion characterized by one or more pre-defined rigid conditions for deleting certain snapshots and/or groups thereof.

9. The method of claim 3, wherein the assessed value characterizes the aggregated amount of unique physical blocks associated, respectively, with all snapshots in a certain storage snapshot pool (SSP).

10. The method of claim 9, wherein the pre-defined criterion is characterized by a combination of said assessed value and a threshold characterized by a ratio between a current amount of storage resources used for storing snapshots in the SSP and a total storage capacity defined for the SSP.

11. The method of claim 4, wherein said indication is provided responsive to at least one condition selected from the group comprising:
   receiving a request for deleting at least the given snapshot;
   achieving one or more rigid conditions for deleting certain snapshots and/or groups thereof; and
   achieving a pre-defined expiration date of said given snapshot.

12. The method of claim 1, wherein said certain group of snapshots is selected from the group comprising:
   a. a group of snapshots constituted by said given snapshot and all its previously created siblings;
   b. a group of snapshots constituted by said given snapshot and all its ancestors;
   c. a group of snapshots constituted by said given snapshot, all its ancestors and all its previously created siblings; and
   d. a group of snapshots constituted by said given snapshot, its ancestors and its siblings, wherein the ancestors and siblings match pre-defined grouping criterion.

13. A storage system comprising a physical storage space operatively connected to a control layer, wherein
   the physical storage space is operable to store a plurality of snapshots of a certain source; the control layer comprises at least one metering unit operable to assess to at least one given snapshot an assessed value characterized by at least one of the following values:
   i. a first value characterizing the amount of unique physical data blocks associated, merely, with said given snapshot;
   ii. a second value characterizing the amount of unique physical blocks associated, merely, with a certain group comprising said given snapshot;
   iii. a combination of the first and the second value,
   and wherein said metering units are further operable to update, responsive to a pre-defined event, the assessed value.

14. The system of claim 13, wherein the control layer comprises at least two metering units, and wherein a first metering unit is operable to assess to a given snapshot an assessed value characterized by the first value, and a second metering unit is operable to assess to said given snapshot an assessed value characterized by the second value.

15. The system of claim 13, further configured to provide each snapshot with at least one dedicated metering unit.

16. The system of claim 13, wherein the pre-defined event is selected from a group of events associated with arriving incoming data related to the source, events associated with a pre-defined time schedule, and events associated with receiving a request for deleting at least the given snapshot.

17. The system of claim 13, wherein said at least one metering unit is further operable to enable alerting when the updated assessed value match a pre-defined criterion.

18. The system of claim 13, wherein said at least one metering unit is further operable to enable indication of the amount of physical resources to be freed resulting from deleting at least the given snapshot, wherein said indication corresponds to the updated assessed value.

19. The system of claim 13, wherein said at least one metering unit is further operable to enable generating deletion recommendation in accordance with the updated assessed value.

20. The system of claim 17, wherein the pre-defined criterion is selected from the group comprising:
   a. criterion characterized by a maximal number of unique blocks associated with all snapshots created before a certain date; and
   b. criterion characterized by one or more pre-defined rigid conditions for deleting certain snapshots and/or groups thereof.

21. The system of claim 18, wherein said indication is provided responsive to at least one condition selected from a group comprising:
   a. receiving a request for deleting at least the given snapshot;
   b. achieving one or more rigid conditions for deleting certain snapshots and/or groups thereof; and
   c. achieving a pre-defined expiration date of said given snapshot.

22. The system of claim 13, wherein said certain group of snapshots is selected from the group comprising:
   a. a group of snapshots constituted by said given snapshot and all its previously created siblings;

b. a group of snapshots constituted by said given snapshot and all its ancestors;
c. a group of snapshots constituted by said given snapshot, all its ancestors and all its previously created siblings; and
d. a group of snapshots constituted by said given snapshot, its ancestors and its siblings, wherein the ancestors and siblings match pre-defined grouping criterion.

23. A method of managing a plurality of snapshots of a certain source, the method comprising, by a storage system:
a. assessing to at least one given snapshot an assessed value characterized by at least one of the following values:
 i. a first value characterizing the amount of unique physical data blocks associated, merely, with said given snapshot;
 ii. a second value characterizing the amount of unique physical blocks associated, merely, with a certain group of snapshots comprising said given snapshot; and
 iii. a combination of the first and the second value; and
b. updating the assessed value responsive to a pre-defined event.

24. A snapshot management module operable to manage a plurality of snapshots of a certain source, the module comprising at least one metering unit, implemented by a combination of at least hardware and software, and operable to assess to at least one given snapshot an assessed value characterized by at least one of the following values:
 i. a first value characterizing the amount of unique physical data blocks associated, merely, with said given snapshot;
 ii. a second value characterizing the amount of unique physical blocks associated, merely, with a certain group of snapshots comprising said given snapshot; and
 iii. a combination of the first and the second value,
wherein said metering units are further operable to update, responsive to a pre-defined event, the assessed value.

25. A computer program comprising computer program code means for performing all the steps of claim 24, when said program is run on a computer.

26. A computer program as claimed in claim 25, embodied on a computer readable medium.

* * * * *